US012606249B2

(12) United States Patent
Otani

(10) Patent No.: US 12,606,249 B2
(45) Date of Patent: Apr. 21, 2026

(54) VEHICLE BODY FRONT STRUCTURE

(71) Applicant: Honda Motor Co., Ltd., Tokyo (JP)

(72) Inventor: Yui Otani, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 18/460,709

(22) Filed: Sep. 5, 2023

(65) Prior Publication Data

US 2024/0132158 A1     Apr. 25, 2024
US 2024/0227943 A9     Jul. 11, 2024

(30) Foreign Application Priority Data

Oct. 20, 2022     (CN) .......................... 202211285794.1

(51) Int. Cl.
*B62D 25/08*          (2006.01)
(52) U.S. Cl.
CPC .................................. *B62D 25/084* (2013.01)
(58) Field of Classification Search
CPC ............................ B62D 25/084; B62D 25/085
See application file for complete search history.

(56) References Cited

U.S. PATENT DOCUMENTS

| | | | | |
|---|---|---|---|---|
| 6,196,624 | B1 * | 3/2001 | Bierjon ................ | B62D 25/084 296/29 |
| 6,679,545 | B1 * | 1/2004 | Balzer .................. | B62D 25/084 296/203.02 |
| 9,586,625 | B2 * | 3/2017 | Crane .................. | B62D 25/084 |
| 2022/0212724 | A1 * | 7/2022 | Kwak ................... | B60K 11/04 |
| 2023/0257023 | A1 * | 8/2023 | Otani .................... | B62D 25/08 296/193.09 |
| 2024/0300585 | A1 * | 9/2024 | Peron ..................... | B60R 19/12 |

FOREIGN PATENT DOCUMENTS

| | | | | | |
|---|---|---|---|---|---|
| CN | 107972476 | A | * | 5/2018 | ............. B60K 11/02 |
| CN | 112141218 | A | * | 12/2020 | ............. B62D 21/15 |
| CN | 115195870 | A | * | 10/2022 | ........... B62D 27/065 |
| CN | 118457207 | A | * | 8/2024 | ............. B60R 19/24 |
| CN | 118457743 | A | * | 8/2024 | ............. B60R 19/34 |
| EP | 2319746 | A2 | * | 5/2011 | ........... B62D 25/084 |
| JP | 2006273050 | | | 10/2006 | |
| JP | 2023-118177 | | | 8/2023 | |

* cited by examiner

*Primary Examiner* — Jason S Morrow
(74) *Attorney, Agent, or Firm* — JCIPRNET

(57)          ABSTRACT
The disclosure provides a vehicle body front structure with a good rigidity. The vehicle body front structure includes a partition disposed in front of the vehicle and configured to support a heat exchanger, a box-shaped part disposed at a lower part of a column member of the partition, continuously connected with the column member of the partition in a height direction of the vehicle, and extending downward to a lower portion than a lower part of the partition.

4 Claims, 5 Drawing Sheets

VEHICLE BODY FRONT STRUCTURE

CROSS-REFERENCE TO RELATED APPLICATION

This application claims the priority benefit of China application serial no. 202211285794.1, filed on Oct. 20, 2022. The entirety of the above-mentioned patent application is hereby incorporated by reference herein and made a part of this specification.

BACKGROUND

Technical Field

The disclosure relates to a vehicle body front structure.

Description of Related Art

In recent years, efforts to provide access to sustainable transport systems that also take into account vulnerable persons such as the elderly or children among traffic participants are being activated. In order to achieve the above purpose, research and development for further improving traffic safety or convenience are being pursued through development related to improving vehicle body rigidity.

On the other hand, in the past, various studies for reducing the size of an engine room of an automobile have also been conducted for the purpose of obtaining a large-space passenger compartment. For example, in Patent Literature 1 (Japanese Patent Laid-Open No. 2006-273050), research has been done on the structure of a radiator core support used as a heat exchanger carrier. However, in Patent Literature 1, the lower side edge of a partition as a radiator core support is formed in a triangular prism. According to this vehicle structure, when the vehicle travels on the boundary between a slope and a flat road, if the front lower part of the vehicle touches the ground, the partition may receive an external force. In this case, the side part of the partition may be broken.

Therefore, in the study of improving vehicle body rigidity in order to improve traffic safety or convenience, how to provide a corresponding safety structure that can effectively withstand the load from below is an unresolved issue.

SUMMARY

The disclosure provides a vehicle body front structure with a good rigidity.

The disclosure provides a vehicle body front structure. The vehicle body front structure includes a partition disposed in front of the vehicle and configured to support a heat exchanger, and a box-shaped part disposed at a lower part of a column member of the partition, continuously connected with the column member of the partition in a height direction of the vehicle and extending downward to a lower portion than a lower part of the partition.

Based on the above, in the vehicle body front structure, through the disposition of the box-shaped part of the lower parts of the column members on the left and right sides extending downward to a lower portion than the lower part of the partition, when the front lower part of the vehicle touches the ground while the vehicle travels on the boundary between a slope and a flat road, the contact load can be absorbed by the box-shaped part, so that the horizontal suspension part of the heat exchanger above the box-shaped part can be prevented from being damaged.

In order to make the above-mentioned features and advantages of the disclosure more comprehensible, the following embodiments are described in detail with reference to the accompanying drawings.

DESCRIPTION OF THE EMBODIMENTS

In an embodiment of the disclosure, the box-shaped part is formed by a first surface part, a second surface part, and a third surface part, in which the first surface part extends along a length direction of the vehicle, and the second surface part and the third surface part are respectively disposed at a front end and a back end of the first surface part and extend outward along a width direction of the vehicle.

In an embodiment of the disclosure, a back surface of the box-shaped part is continuous with a back surface of the column member of the partition in the height direction of the vehicle, an extension part extending toward a front side of the length direction of the vehicle is provided at an intersection of the box-shaped part and the column member, and a connection portion of the extension part with respect to the box-shaped part and the column member is in an ararc-shape arc-shape.

Figure 1:
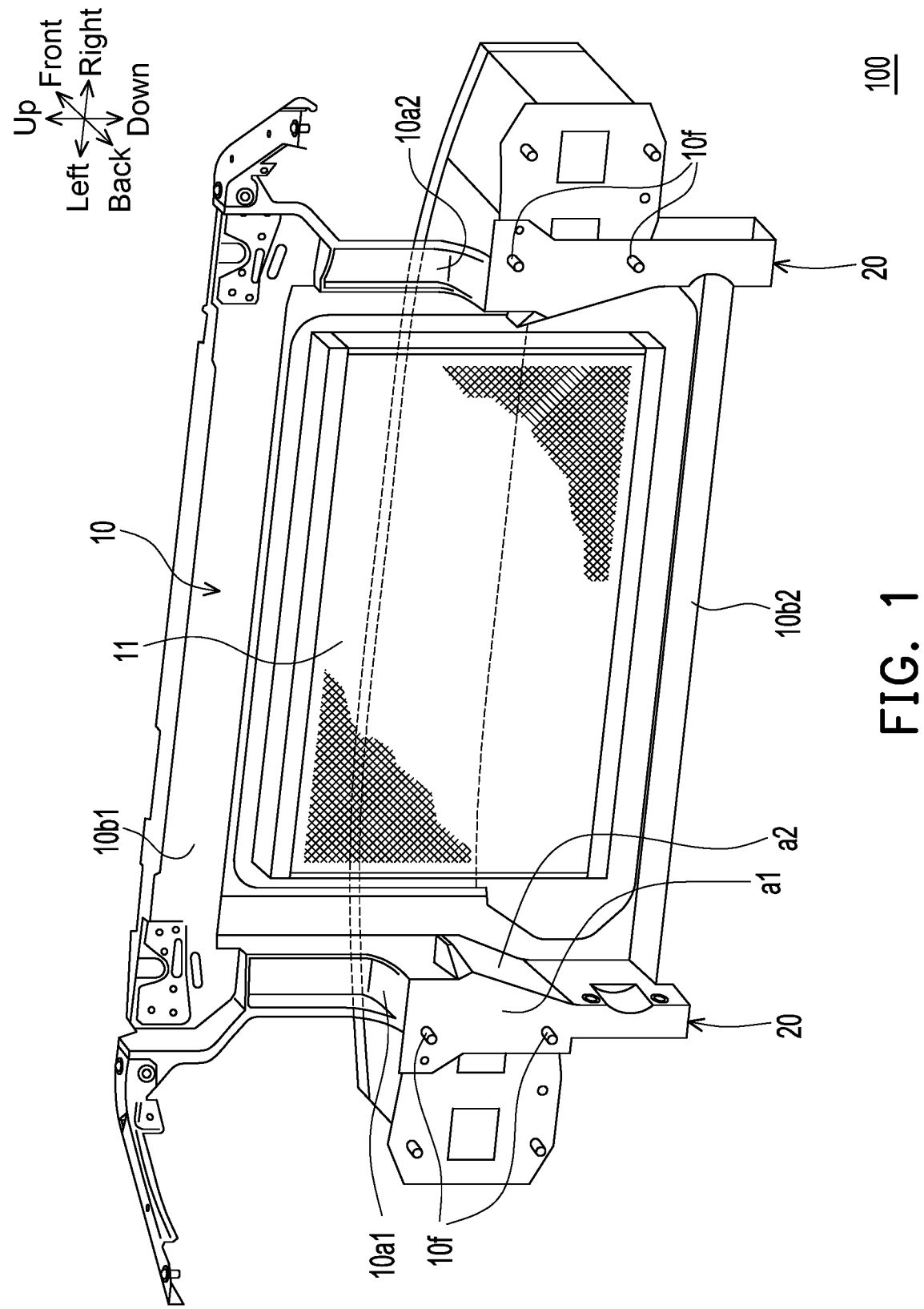
FIG. 1 is a rear view of a vehicle body front structure according to an embodiment of the disclosure.
Figure 2:
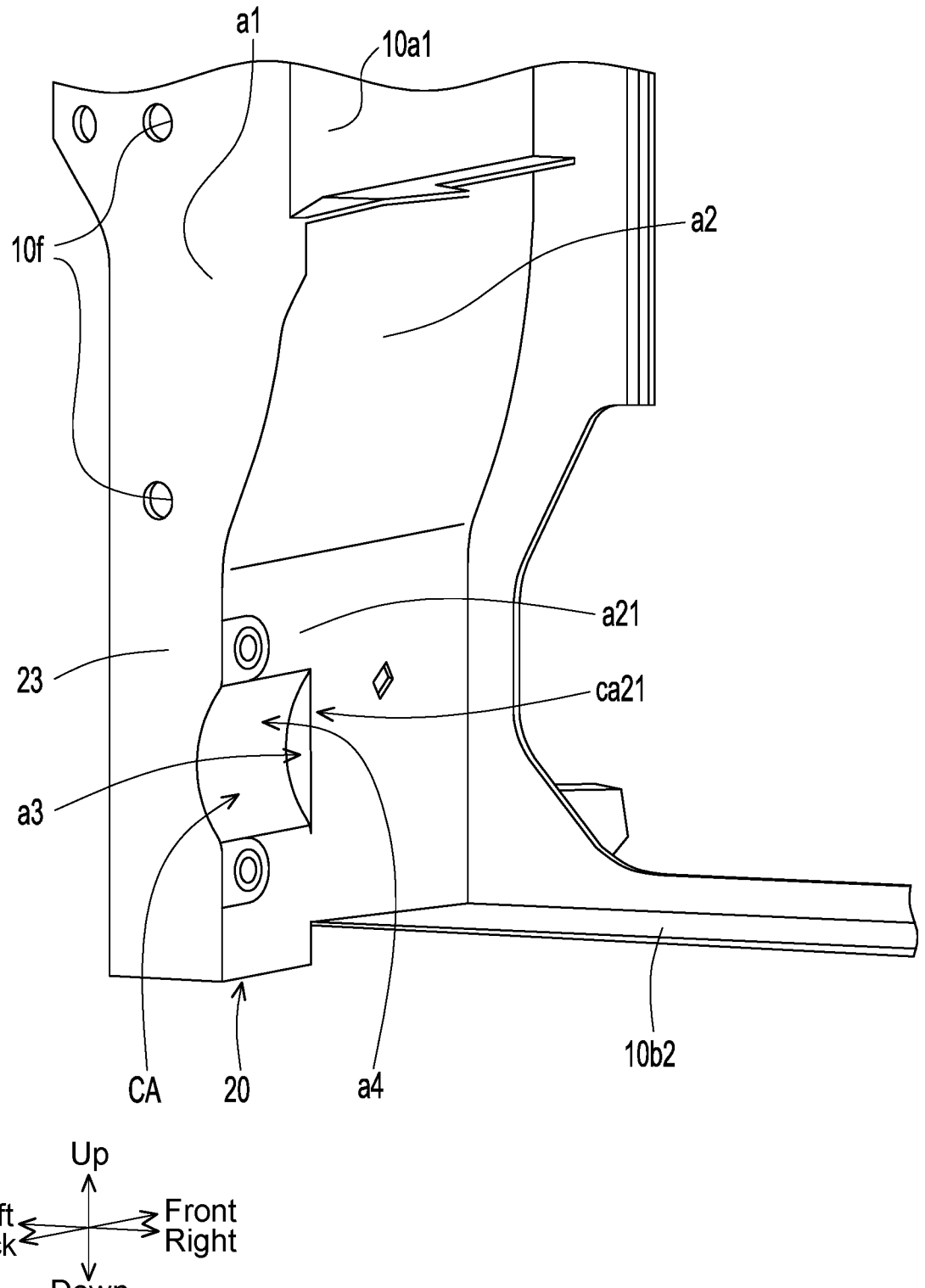
FIG. 2 is a structural schematic view of a box-shaped part shown in FIG. 1 viewed obliquely from behind.
Figure 3:
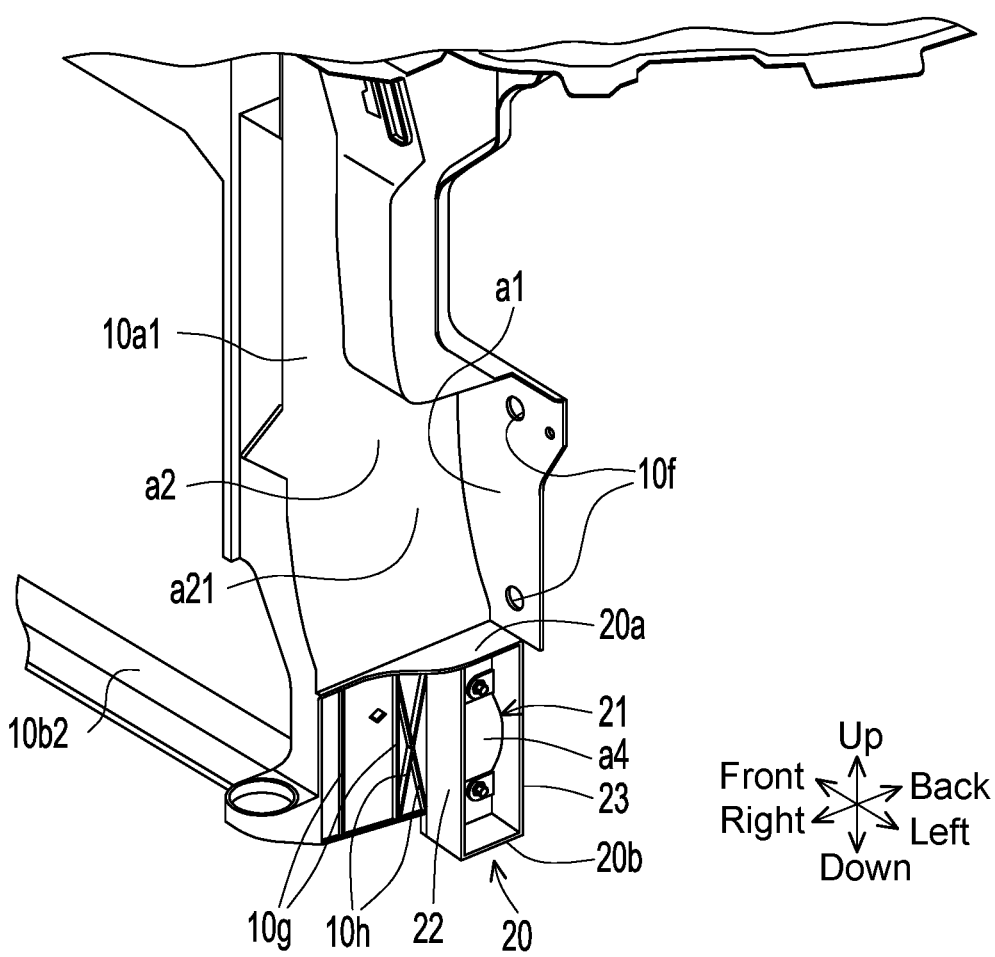
FIG. 3 is a structural schematic view of the box-shaped part shown in FIG. 1 viewed obliquely from the front.
Figure 4A:
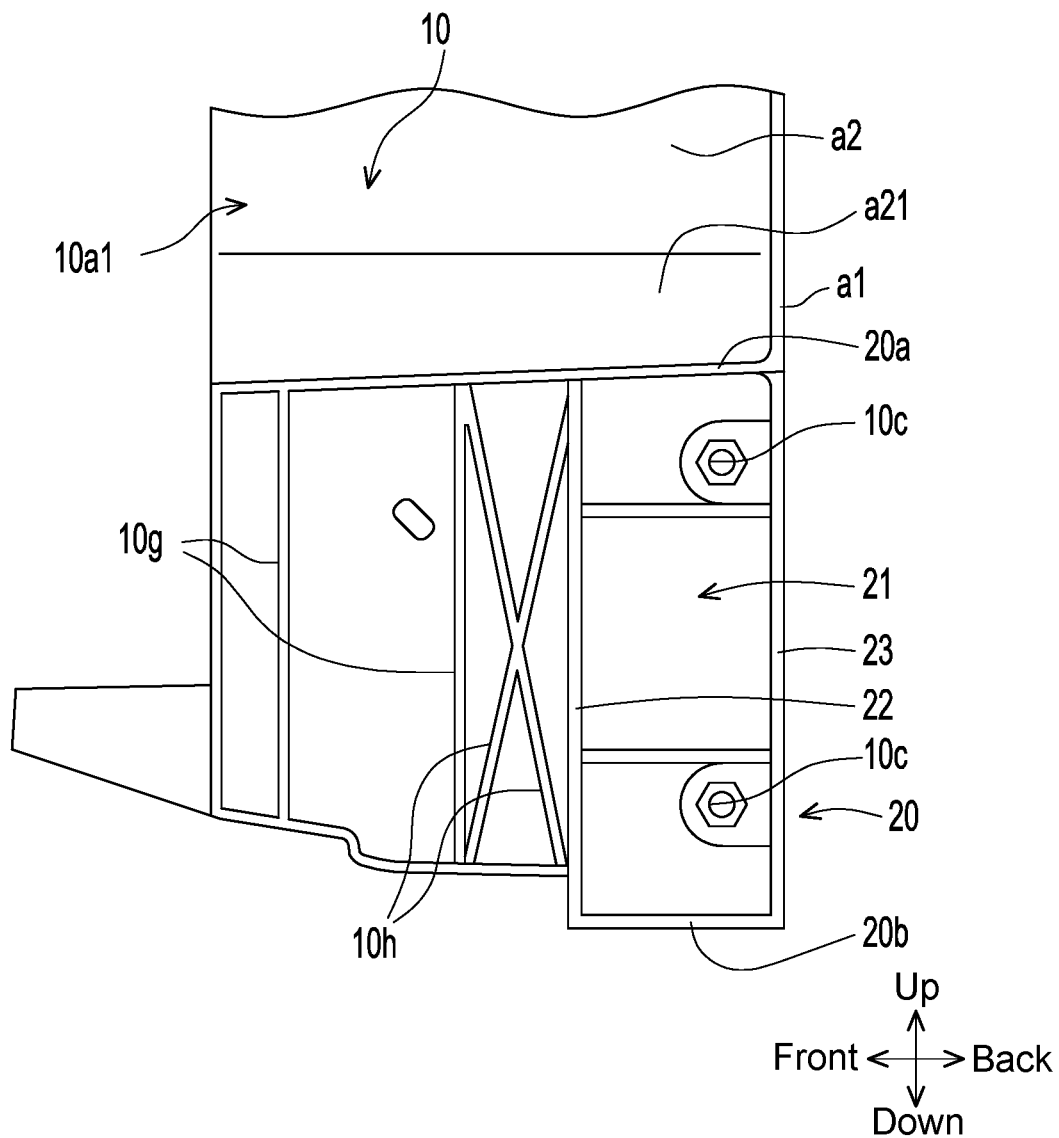
FIG. 4A is a schematic structural view of the box-shaped part shown in FIG. 1 viewed from the side.
Figure 4B:
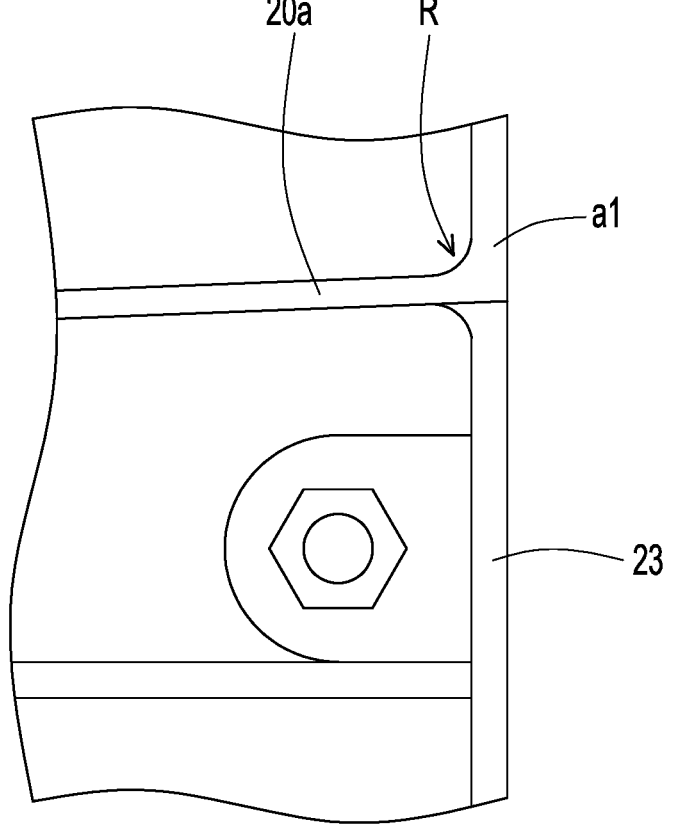
FIG. 4B is a partially enlarged schematic view of the box-shaped part in FIG. 4A.

FIG. 1 is a rear view of a vehicle body front structure according to an embodiment of the disclosure; FIG. 2 is a structural schematic view of a box-shaped part shown in FIG. 1 viewed obliquely from behind. FIG. 3 is a structural schematic view of the box-shaped part shown in FIG. 1 viewed obliquely from the front. FIG. 4A is a schematic structural view of the box-shaped part shown in FIG. 1 viewed from the side. FIG. 4B is a partially enlarged schematic view of the box-shaped part in FIG. 4A. In addition, for the convenience of the below description, the front-back direction, the left-right direction, and the up-down direction of a vehicle are defined as shown in the drawings, and the structure of each part is described based on this definition. The front-back direction, the left-right direction, and the up-down direction correspond to the length direction of the vehicle, the width direction of the vehicle, and the height direction of the vehicle, respectively. In addition, in the embodiment, a vehicle body front structure 100 refers to a structure disposed near a partition 10 in an engine hood at the front of the vehicle.

Please refer to FIG. 1, in this embodiment, the vehicle body front structure 100 includes the partition 10 and a box-shaped part 20. Specifically, as shown in FIG. 1, in this embodiment, the partition 10 is made of resin, disposed at the front of the vehicle, presented in a rectangular frame shape when viewed from the back (or from the front), and configured to support a heat exchanger 11 such as a radiator inside the rectangular frame. The rectangular frame of the partition 10 includes beam members 10*b*1, 10*b*2 on the upper and lower sides and column members 10*a*1, 10*a*2 on the left and right sides. The beam members 10*b*1, 10*b*2 extend horizontally at intervals up and down in the width direction of the vehicle, and the column members 10a1, 10a2 connect a left end and a right end of the beam members 10b1, 10b2 positioned up and down in the height direction of the vehicle.

Specifically, as shown in FIG. 1 to FIG. 3, in this embodiment, the column members 10a1, 10a2 of the partition 10 are respectively fixed to the vehicle body by two vehicle body fixing parts 10f separated up and down. The vehicle body fixing parts 10f separated up and down are disposed at an upper end and a lower end extending downward from an up and down intermediate position of the column members 10a1, 10a2 for a predetermined length, and the vehicle body fixing parts 10f are disposed on a vehicle body fixing surface part a1 of the column members 10a1, 10a2 facing the vehicle body in the length direction of the vehicle. For example, in this embodiment, the vehicle body fixing parts 10f up and down comprise in such a manner that the vehicle body fixing surface part a1 is fixed to the vehicle body by inserting screws, bolts, etc. into through holes formed behind the vehicle body fixing surface part a1.

Further, as shown in FIG. 2 and FIG. 3, in this embodiment, the vehicle body fixing surface part a1 is connected at a right angle to a column side surface part a2 facing the width direction of the vehicle. The column side surface part a2 extends between the upper beam member 10b1 and the lower beam member 10b2. A cross-sectional shape of the column side surface part a2 and the vehicle body fixing surface part a1 is in an L-shape.

On the other hand, as shown in FIG. 2, in the embodiment, in the column member 10a1 at the left side, a cavity part ca21 is provided at a vehicle interior joint surface part a21 of the column side surface part a2 near the vehicle body fixing surface part a1. A pump support surface part a3 facing the front-back direction is joined at a right angle to the vehicle interior joint surface part a21 at the lower side of the cavity part ca21. The pump support surface part a3 is disposed as to transition from an intermediate part to a lower part of the column member 10a1 in the front-back direction. The pump support surface part a3 is joined to a pump fixing surface part a4 disposed with a water pump fixing part 10c. The pump fixing surface part a4 has a curved plate-shaped center part protruding outward in the width direction of the vehicle. The pump fixing surface part a4 is perpendicular to the pump support surface part a3 and joined to the pump support surface part a3 on the front side.

Furthermore, as shown in FIG. 1 to FIG. 3, in the embodiment, the box-shaped part 20 is disposed between the pump support surface part a3 and the vehicle body fixing surface part a1. The box-shaped part 20 is disposed below the vehicle body fixing part 10f (or the vehicle body fixing surface part a1) of the left and right column members 10a1, 10a2 of the partition 10. Furthermore, in this embodiment, the box-shaped part 20 is disposed at a lower part of the column members 10a1, 10a2 of the partition 10, and is positioned below the vehicle body fixing surface part a1. Also, the box-shaped part 20 is continuously connected to the column members 10a1, 10a2 of the partition 10 in the height direction of the vehicle, and extending downward to a lower portion than a lower part of the partition 10. In addition, as shown in FIG. 1, when the partition 10 has a transverse suspension structure in which the heat exchanger 11 is suspended and supported by a transverse shaft, the box-shaped part 20 is positioned below the position of the transverse suspension part. In this way, since the rigidity of the lower part of the column members 10a1, 10a2 of the partition 10 can be increased by the disposition of the box-shaped part 20, the load which tends to cause breaking when the partition 10 touches the ground can be effectively withstood. In this way, when the front lower part of the vehicle touches the ground when the vehicle travels on the boundary between a slope and a flat road, since the contact load is absorbed by the box-shaped part 20, the horizontal suspension part of the heat exchanger above the box-shaped part can be prevented from being damaged.

More specifically, as shown in FIG. 2 and FIG. 3, in the column member 10a1 on the left side, the box-shaped part 20 is formed by an upper surface part 20a, a lower surface part 20b, a first surface part 21, a second surface part 22, and a third surface part 23, in which the first surface part 21 extends along the length direction of the vehicle, and the second surface part 22 and the third surface part 23 are respectively disposed at a front end and a back end of the first surface part 21 and extend outward along the width direction of the vehicle. In addition, as shown in FIG. 2 and FIG. 3, the upper surface part 20a of the box-shaped part 20 is connected to the vehicle body fixing surface part a1 and has a horizontal surface substantially in a trapezoidal shape in plan view, and extends in the front-back direction and the width direction of the vehicle. The first surface part 21 of the box-shaped part 20 is substantially formed by the pump fixing surface part a4 and a part of the vehicle interior joint surface part a21. The second surface part 22 and the third surface part 23 respectively connect the front ends and the back ends of the upper surface part 20a and the lower surface part 20b to form a structure of the box-shaped part 20 having an opening. As such, since the box-shaped part 20 does not have a closed cross-section, a surface thereof may be utilized to dispose jig holes and fixing holes and thereby the strength is improved.

In addition, as shown in FIG. 2, in the column member 10a1 on the left side, the box-shaped part 20 is disposed so as to be offset from other portions in the length direction of the vehicle and the width direction of the vehicle to have a step difference. Specifically, the third surface part 23 of the box-shaped part 20 and the pump support surface part a3 are shifted in the front-back direction. In addition, the pump fixing surface part a4 and the vehicle interior joint surface part a21 on the front side of the cavity part ca21 are shifted in the width direction of the vehicle. In this way, in the column member 10a1 on the left side, an arc-shaped cavity CA configured to dispose a water pump may be formed.

On the other hand, as shown in FIG. 3 and FIG. 4A, in the embodiment, a back surface of the box-shaped part 20 is continuous with a back surface of the column member 10a1 of the partition 10 in the height direction of the vehicle. That is, the back surface of the third surface part 23 of the box-shaped part 20 is continuous with the back surface of the vehicle body fixing surface part a1 in the height direction of the vehicle. Furthermore, as shown in FIG. 4B, at an intersection of the box-shaped part 20 and the column member 10a1 (that is, the third surface part 23 of the box-shaped part 20 and the vehicle body fixing surface part a1), there is an extension part R extending toward a front side of the length direction of the vehicle (that is, the portion of the upper surface part 20a of the box-shaped part 20 close to the intersection of the box-shaped part 20 and the column member 10a1), and a connection portion of a surface of the extension part R connecting with the front surface of the third surface part 23 of the box-shaped part 20 and a connection portion of the surface of the extension part R connecting with the front surface of the column member 10a1 are in an arc-shape. In this way, localized load concentration at the boundary can be avoided, thereby making the partition 10 less likely to be cracked. It is worth noting that if the arc profile is too large, poor molding and deformed sink marks may appear during resin molding. Therefore, it is necessary to set an appropriate R-shaped chamfer to make the structure meet the requirements.

As shown in FIG. 3, a longitudinal rib 10g extending vertically is disposed on the side surface of the column member 10a1 in front of the box-shaped part 20, and a diagonal rib 10h is disposed on the back side of the longitudinal rib 10g. The diagonal rib 10h is disposed at a position closer to the box-shaped part 20 than the longitudinal rib 10g in the length direction of the vehicle. As shown in FIG. 4A, the diagonal ribs 10h are configured such that two diagonal ribs 10h inclined in opposite directions cross each other on the side surface of the column member 10a1. That is, the column member 10a1 is comprised by the diagonal ribs 10h with high rigidity which crosses obliquely in opposite directions on the front side of the box-shaped part 20 and the side surface of the back side of the longitudinal rib 10g. For example, when the front lower part of the vehicle touches the ground while the vehicle travels on the boundary between a slope and a flat road, the partition 10 receives oblique upward and backward loads when touching the ground. At this time, a large load is transmitted to the diagonal ribs 10h with high rigidity on the back side via the longitudinal rib 10g on the front side. In this way, when the front lower part of the vehicle touches the ground while the vehicle travels on the boundary between a slope and a flat road, the load can be further absorbed due to the diagonal ribs 10h with high rigidity.

In addition, as shown in FIG. 1, the structure of the column member 10a2 on the right is similar to the column member 10a1 on the left, the only difference is that the column member 10a2 on the right does not need to be disposed with the arc-shaped cavity CA configured to dispose the water pump. Therefore, the vehicle interior joint surface part a21 of the column side surface part a2 close to the vehicle body fixing surface part a1 does not have the cavity part ca21. In this way, since the box-shaped part 20 still extends downward to a lower portion than the lower part of the partition 10, when the front lower part of the vehicle touches the ground while the vehicle travels on the boundary between a slope and a flat road, the contact load can still be absorbed by the box-shaped part 20, so that the horizontal suspension part of the heat exchanger 11 above the box-shaped part 20 can be prevented from being damaged.

In summary, in the embodiments of the disclosure, through the disposition of the box-shaped part, the vehicle body front structure can improve the rigidity of the lower part of the column member of the partition, so the load which tends to cause breaking when the partition touches the ground can be effectively withstood. In this way, when the front lower part of the vehicle touches the ground when the vehicle travels on the boundary between a slope and a flat road, the contact load can be absorbed by the box-shaped part, so that the horizontal suspension part of the heat exchanger above the box-shaped part can be prevented from being damaged.

Finally, it should be noted that the above embodiments are only used to illustrate the technical solutions of the disclosure, rather than to limit them. Although the disclosure has been described in detail with reference to the foregoing embodiments, persons skilled in the art should understand that it is still possible to modify the technical solutions described in the foregoing embodiments or perform equivalent replacements for some or all of the technical features. However, the modifications or substitutions do not make the essence of the corresponding technical solutions depart from the scope of the technical solutions of the embodiments of the disclosure.

What is claimed is:

1. A vehicle body front structure, comprising:
   a partition disposed in front of the vehicle and configured to support a heat exchanger; and
   a box-shaped part disposed at a lower part of a column member of the partition, continuously connected with the column member of the partition in a height direction of the vehicle, and extending downward to a lower portion than a lower part of the partition,
   wherein the box-shaped part is formed by an upper surface part, a lower surface part, a first surface part, a second surface part, and a third surface part, and the first surface part extends along a length direction of the vehicle,
   wherein the second surface part and the third surface part are respectively disposed at a front end and a back end of the first surface part and extend outward from the first surface part along a width direction of the vehicle,
   wherein the second surface part and the third surface part respectively connect front ends and rear ends of the upper surface part and the lower surface part,
   wherein the box-shaped part has an opening on an outer side in the width direction of the vehicle.

2. The vehicle body front structure according to claim 1, wherein a back surface of the box-shaped part is continuous with a back surface of the column member of the partition in the height direction of the vehicle, an extension part extending toward a front side of the length direction of the vehicle is provided at an intersection of the box-shaped part and the column member, and a connection portion of the extension part with respect to the box-shaped part and the column member is in an arc-shape.

3. A vehicle, comprising:
   the vehicle body front structure according to claim 1.

4. A vehicle, comprising:
   the vehicle body front structure according to claim 2.

* * * * *